United States Patent
Kajiwara

(10) Patent No.: US 10,578,068 B2
(45) Date of Patent: Mar. 3, 2020

(54) IDLING STOP CONTROL APPARATUS AND FAILURE DIAGNOSIS SYSTEM

(71) Applicant: DENSO CORPORATION, Kariya, Aichi-pref. (JP)

(72) Inventor: Yasuhiro Kajiwara, Kariya (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 16/062,750

(22) PCT Filed: Dec. 16, 2016

(86) PCT No.: PCT/JP2016/087646
§ 371 (c)(1),
(2) Date: Jun. 15, 2018

(87) PCT Pub. No.: WO2017/104832
PCT Pub. Date: Jun. 22, 2017

(65) Prior Publication Data
US 2019/0128231 A1    May 2, 2019

(30) Foreign Application Priority Data
Dec. 18, 2015    (JP) ................... 2015-247194

(51) Int. Cl.
*F02N 11/08*    (2006.01)
*F02D 41/22*    (2006.01)
(Continued)

(52) U.S. Cl.
CPC ........ *F02N 11/0818* (2013.01); *F02D 41/042* (2013.01); *F02D 41/08* (2013.01);
(Continued)

(58) Field of Classification Search
CPC ........ F02D 41/042; F02D 41/08; F02D 41/22; F02D 2041/228; F02D 2200/501;
(Continued)

(56) References Cited

U.S. PATENT DOCUMENTS

| | | | |
|---|---|---|---|
| 2004/0046394 A1* | 3/2004 | Lim | B60K 6/485 290/40 C |
| 2011/0160985 A1* | 6/2011 | Yamaguchi | B60W 50/0205 701/112 |

(Continued)

FOREIGN PATENT DOCUMENTS

| | | | |
|---|---|---|---|
| JP | 5714132 B2 | * | 5/2015 |
| JP | 2015143518 A | * | 8/2015 |
| WO | WO-2014034088 A1 | * | 3/2014 |

OTHER PUBLICATIONS

JP 5,714,132, machine translation (Year: 2015).*
(Continued)

*Primary Examiner* — Hung Q Nguyen
*Assistant Examiner* — Mark L. Greene
(74) *Attorney, Agent, or Firm* — Oliff PLC

(57) ABSTRACT

An idling stop control apparatus of an embodiment includes: an idling stop condition satisfaction determination section that determines whether an idling stop condition, which is a predetermined condition for stopping idling of an engine of a vehicle, is satisfied; an idling stop prohibition determination section that determines that, if the idling stop condition is satisfied, an idling stop prohibition condition is satisfied due to occurrence of one or more specific idling stop prohibition factors due to which idling stop is prohibited from being performed; and a number of times of prohibition counter that counts a number of times of prohibition, which is a number of times that the idling stop prohibition determination section has determined that the idling stop prohibition condition has been satisfied.

15 Claims, 7 Drawing Sheets

(51) Int. Cl.
*F02D 41/04* (2006.01)
*F02D 41/08* (2006.01)

(52) U.S. Cl.
CPC ........ *F02D 41/22* (2013.01); *F02D 2041/228* (2013.01); *F02D 2200/501* (2013.01); *F02D 2200/602* (2013.01); *F02N 2200/0801* (2013.01); *F02N 2200/0814* (2013.01); *F02N 2200/102* (2013.01); *F02N 2200/106* (2013.01)

(58) Field of Classification Search
CPC ........... F02D 2200/602; F02N 11/0818; F02N 2200/0801; F02N 2200/0814; F02N 2200/102; F02N 2200/106
See application file for complete search history.

(56) References Cited

U.S. PATENT DOCUMENTS

| | | |
|---|---|---|
| 2014/0358359 A1 | 12/2014 | Yagi et al. |
| 2015/0178997 A1 | 6/2015 | Ohsaki |
| 2015/0211468 A1 | 7/2015 | Ezumi et al. |
| 2018/0261024 A1* | 9/2018 | Books ................. F02N 11/0818 |

OTHER PUBLICATIONS

JP 2015/143518, machine translation (Year: 2015).*
WO 2014/034088, machine translation (Year: 2014).*
Mar. 7, 2017 International Search Report issued in International Patent Application No. PCT/JP2016/087646.

* cited by examiner

FIG.5

|  | NUMBER OF TIMES | FREQUENCY |
|---|---|---|
| NUMBER OF TIMES OF SATISFACTION OF IDLING STOP CONDITION | * * TIMES | — |
| NUMBER OF TIMES OF PROHIBITION OF IDLING STOP FOR EACH FACTOR | | |
| MASTER CYLINDER PRESSURE FOR STOP | * * TIMES | * * % |
| ENGINE HOOD OPENING | * * TIMES | * * % |
| DRIVING OF LIGHTS | * * TIMES | * * % |
| DRIVING OF BLOWER | * * TIMES | * * % |
| ⋮ | ⋮ | ⋮ |
| OTHERS | * * TIMES | * * % |

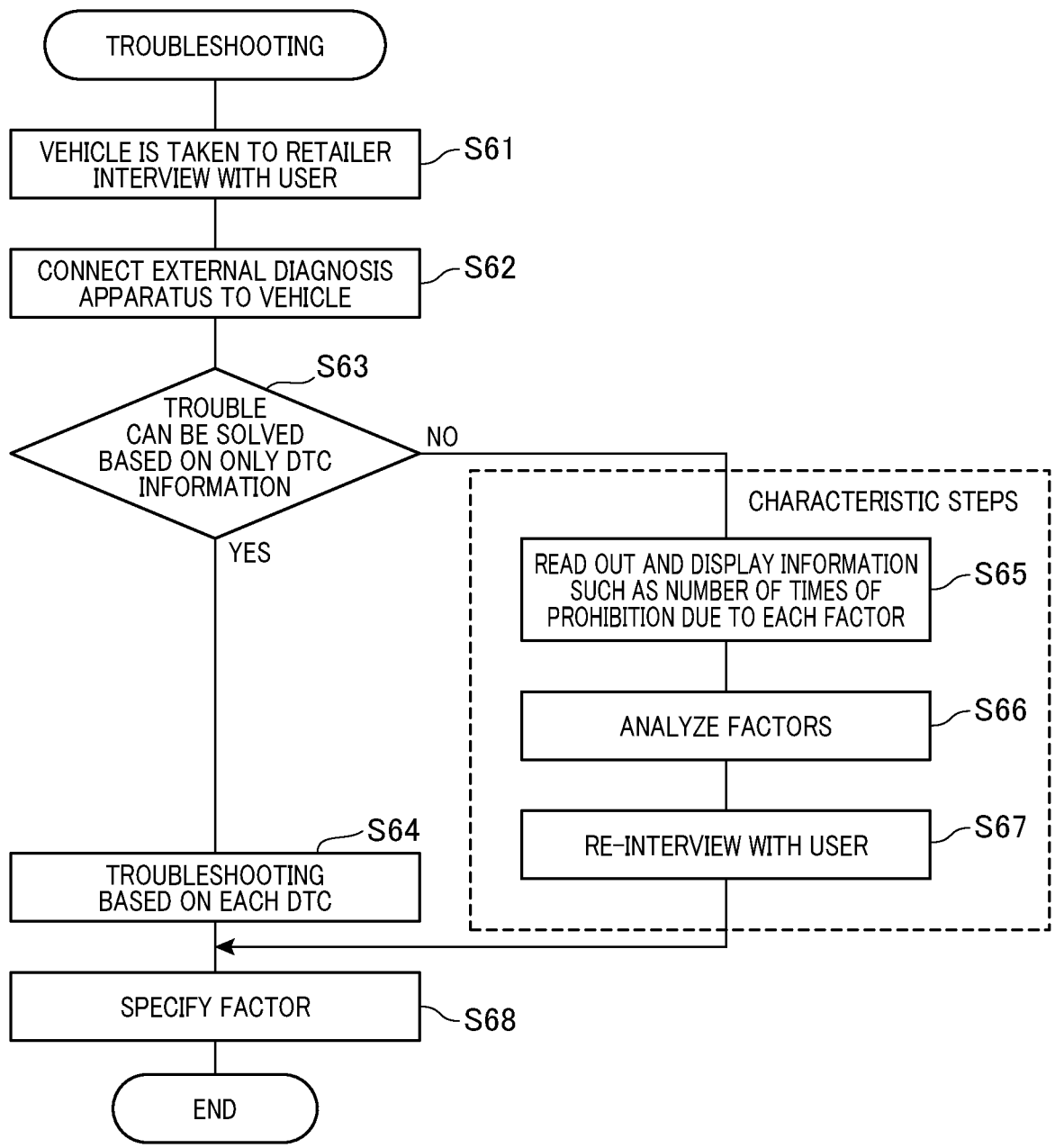

IDLING STOP CONTROL APPARATUS AND FAILURE DIAGNOSIS SYSTEM

TECHNICAL FIELD

The present invention relates to an idling stop control apparatus that controls idling stop of an engine of a vehicle, and a failure diagnosis system including the same.

BACKGROUND ART

A technique is known which is for a vehicle performing idling stop to contribute to reduction of fuel consumption and environmental protection. In this technique, even if idling stop conditions are satisfied, if idling stop prohibition conditions are further satisfied, the idling stop is not performed. However, users cannot determine whether the idling stop has not been performed normally based on prohibition factors or not been performed due to a failure of the vehicle, whereby automobile retailers tend to receive frequent inquiries.

According to the vehicle diagnosis system disclosed in patent literature 1 based on such a background, communication is carried out between a plurality of electronic control units in a vehicle and an external diagnosis unit to perform failure diagnosis for the vehicle. The external diagnosis unit registers a plurality of idling stop conditions for performing idling stop registered in any one of the electronic control units. When the vehicle is stopped in a state where the vehicle is connected with the external diagnosis unit and is being driven, the idling stop conditions that are not satisfied when the idling stop is not performed are displayed on a predetermined display.

CITATION LIST

Patent Literature

[Patent Literature 1] Japanese Patent No. 5714132

SUMMARY OF THE INVENTION

Technical Problem

In the vehicle diagnosis system disclosed in patent literature 1, an operator requires a user to reproduce a driving state where "idling stop is not often activated", to determine whether idling stop is performed normally in a state where the vehicle is driven. Hence, an interview by the operator needs time. In addition, the driving state is reproduced in a state where the user rides the vehicle with the operator. Hence, a burden on the user increases.

To solve the above problems, a method is generally known which stores necessary information in advance in an electronic control unit by using DTC (i.e. failure code) or information associated therewith. However, an inquiry about non-operational idling stop is often made when conditions for prohibiting idling stop in common usage of the vehicle by a user are present and when the user does not recognize those, though the vehicle is operating normally. Hence, there are problems that cannot be solved only by the conventional DTC.

Solution to Problem

An embodiment provides an idling stop control apparatus that can appropriately diagnose a factor due to which idling stop is not performed, in a short time, and a failure diagnosis system including the same.

An idling stop control apparatus of an embodiment includes: an idling stop condition satisfaction determination section that determines whether an idling stop condition, which is a predetermined condition for stopping idling of an engine of a vehicle, is satisfied; an idling stop prohibition determination section that determines that, if the idling stop condition is satisfied, an idling stop prohibition condition is satisfied due to occurrence of one or more specific idling stop prohibition factors due to which idling stop is prohibited from being performed; and a number of times of prohibition counter that counts a number of times of prohibition, which is a number of times that the idling stop prohibition determination section has determined that the idling stop prohibition condition has been satisfied.

BRIEF DESCRIPTION OF THE DRAWINGS

FIG. 5 is a diagram illustrating an example of screen display in a tabular form in an external diagnosis unit;

FIG. 7 is a flowchart of troubleshooting when idling stop is not performed.

DESCRIPTION OF EMBODIMENTS

First Embodiment

Hereinafter, an embodiment of an idling stop control apparatus and a failure diagnosis system of the present invention will be described with reference to the drawings. In the figures, idling stop is referred to as IS.

Figure 1:
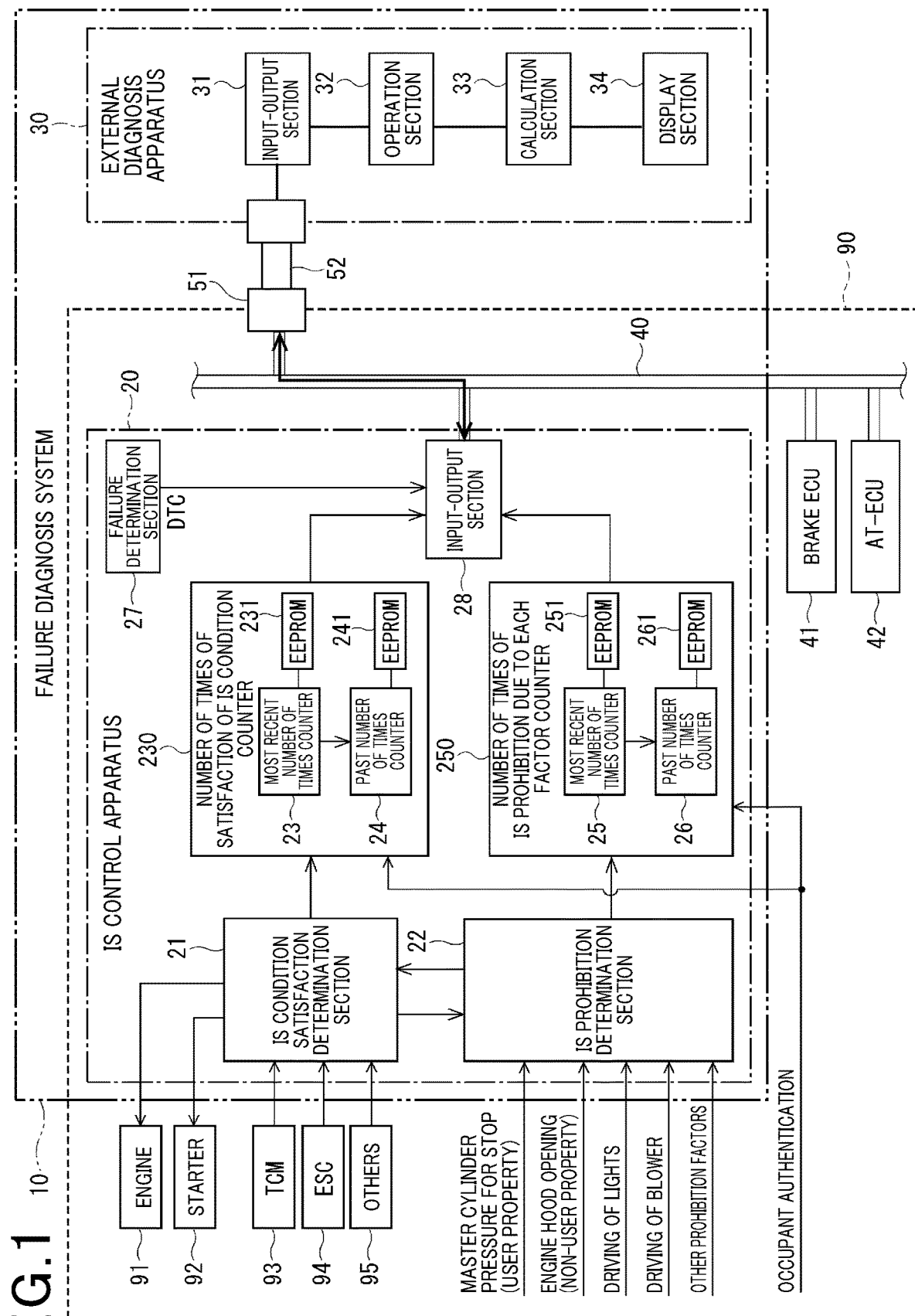
FIG. 1 is a drawing illustrating an overall configuration of a failure diagnosis system according to an embodiment.

FIG. 1 illustrates an overall configuration of a failure diagnosis system 10. The failure diagnosis system 10 includes an idling stop control apparatus 20 that controls idling stop of an engine 91 installed in a vehicle 90, and an external diagnosis apparatus 30. The external diagnosis apparatus 30 is connected to the idling stop control apparatus 20 and exchanges information with the idling stop control apparatus 20 to diagnose the vehicle 90.

The idling stop control apparatus 20 includes an idling stop condition satisfaction determination section 21, an idling stop prohibition determination section 22, a number of times of satisfaction of condition counter 230, a number of times of prohibition due to each factor counter 250, a failure determination section 27, and input-output section 28.

The idling stop condition satisfaction determination section 21 acquires shift information from a TCM (Transmission Control Module) 93, wheel pulses and master cylinder pressure information for stop from an ESC (Electronic Stability Control, i.e. antiskid brake system) 94, and information from other information sources 95. The idling stop condition satisfaction determination section 21 determines that a vehicle stop condition is satisfied as an "idling stop condition", which is a predetermined condition for stopping idling of the engine 91, based on the acquired information.

If the idling stop condition is satisfied, the idling stop prohibition determination section 22 determines that the idling stop prohibition condition is satisfied due to the occurrence of one or more specific "idling stop prohibition factors" (hereinafter, "prohibition factors") due to which idling stop is prohibited from being performed. The specific prohibition factors include, for example, master cylinder pressure for stop, opening of an engine hood, driving of lights, and driving of a blower.

A condition of master cylinder pressure for stop is established based on lack of pressure created when a user depresses a brake pedal. While the vehicle is stopped, if the master cylinder pressure for stop is less than a predetermined value because the user has weakly depressed the brake pedal, the idling stop is not performed. This factor is considered to be mainly based on user properties, that is, daily usage of a vehicle by a user or a habit of the user. As described, prohibition factors based on the user properties are referred to as "user property factors".

An engine hood opening condition is established based on, for example, forgetting to close a hood after a daily check. Also in this case, idling stop is not performed. An accidental factor such as forgetting to close a hood, which is not intended by a user, is likely to be caused by any users similarly. As described, prohibition factors not based on the user properties are referred to as "non-user property factors". In addition, environmental factors such as weather are also examples of the non-user property factors.

The driving of lights and the driving of a blower are inhibition factors established by prioritizing the continuation of driving of the engine to ensure supply of electrical power for accessories, when the accessories such as various lights and a blower for an air conditioner are driven while the vehicle is stopped.

It is noted that it cannot be necessarily distinguished whether factors such as the driving of lights and the driving of a blower are user property factors or non-user property factors under conditions such as an area or a season in which the vehicle is used. For example, in an area of countries having a tropical climate where an air conditioner is naturally used during driving, it can be considered that a blower is used while the vehicle is stopped, due to non-user property factors that do not depend on user properties. In contrast, in an area having a climate where an air conditioner is not necessary on a daily basis, it can be considered that a blower is used while the vehicle is stopped, due to user property factors. As described, the distinction between the user property factors and the non-user property factors is appropriately made not absolutely but depending on the area, the season, or the like.

When the above idling stop prohibition factor is further caused when the idling stop conditions are satisfied, the idling stop prohibition determination section 22 notifies the idling stop condition satisfaction determination section 21 to prohibit the idling stop. In this case, even if the idling stop conditions are satisfied while the vehicle is stopped, the idling stop is not performed.

In contrast, when the idling stop conditions are satisfied, and when the idling stop prohibition determination section 22 does not notify the idling stop condition satisfaction determination section 21 to prohibit the idling stop, the idling stop condition satisfaction determination section 21 requests stopping the engine 21 to perform the idling stop, thereby contributing to reduction of fuel consumption and environmental protection.

In addition, after the engine 91 is stopped by the idling stop, when the idling stop conditions are canceled, the idling stop condition satisfaction determination section 21 drives a starter 92 to start the engine 91.

Since such idling stop control is a well-known technique, the detailed description thereof is omitted.

Next, the configuration of each of the counters, which are characteristic components of the present embodiment, will be described.

The number of times of satisfaction of condition counter 230 counts "the number of times of satisfaction of idling stop condition", which is "the number of times of determinations by the idling stop condition satisfaction determination section 21 that the idling stop conditions have been satisfied." Hereinafter, "the number of times of satisfaction of idling stop condition" is simply referred to as "condition satisfaction number of times".

The number of times of prohibition due to each factor counter 250 counts "the number of times of prohibition of idling stop" (hereinafter, referred to as "prohibition number of times"), which is "the number of times of determinations by the idling stop prohibition determination section 22 that the idling stop prohibition conditions are satisfied". Specifically, the number of times of prohibition due to each factor counter 250 counts each of the numbers of times of prohibition due to each of the plurality of prohibition factors.

In the following description concerning the number of times of prohibition due to each factor counter 250, parts where it is not necessarily presumed that the counter 250 operates for each factor, the term "number of times of prohibition counter 250" is used.

Into the number of times of satisfaction of condition counter 230 and the number of times of prohibition counter 250, occupant authentication information indicating whether or not the occupant as a driver is a main user is input. If a user different from the main user rides the vehicle as a driver, counting the various numbers is prohibited.

The number of times of satisfaction of condition counter 230 and the number of times of prohibition counter 250 respectively include most recent number of times counters 23 and 25 that count the most recent number of times of occurrences, and past number of times counters 24 and 26 that count the past number of times of occurrences before starting to count the most recent number of times of occurrences.

In addition, the number of times of satisfaction of condition counter 230 has non-volatile memories 231 and 241 that respectively store count values of the most recent number of times counter 23 and the past number of times counter 24. Similarly, the number of times of prohibition due to each factor counter 250 has non-volatile memories 251 and 261 that respectively store count values of the most recent number of times counter 25 and the past number of times counter 26. The non-volatile memories 231, 241, 251, and 261 serving as "storage sections" are configured by, for example, EEPROMs. Even when a power supply of the vehicle 90 is disconnected, count values of the counters can be stored.

The failure determination section 27 has a configuration similar to that of conventional one. The failure determination section 27 determines that a failure concerning the idling stop control apparatus has occurred, and stores a DTC (Diagnostic Trouble Code, i.e. failure code) corresponding to the failure content.

The input-output section 28 is connected to a network bus 40 serving as a communication path, and can be accessed by an external unit. In the present embodiment, the number of times of satisfaction of the conditions and the number of times of prohibition can be read out and reset by an external unit via the input-output section 28. It is noted that, in other embodiments, at least reading out and resetting the number of times of prohibition can be performed.

In addition, the DTC stored in the failure determination section 27 can also be read out by an external unit via the input-output section 28.

It is noted that various pieces of input-output information concerning the idling stop condition satisfaction determination section 21 and the idling stop prohibition determination section 22 are also transmitted to or received from other controllers and the like via the input-output section 28 in practice. It is noted that, in FIG. 1, communication paths for that communication are not shown for simplicity.

The network bus 40 is a transmission path of an electronic network configured by a plurality of controllers installed in the vehicle 90. The idling stop control apparatus 20 can communicate with other controllers such as a brake ECU 41 and an AT-ECU (i.e. automatic transmission ECU) 42 via the network bus 40. As network protocol, CAN is typically used. It is noted that, in other embodiments, the idling stop control apparatus 20 and the plurality of controllers in the vehicle 90 may communicate with each other via individual communication paths.

The external diagnosis apparatus 30 is connected to the idling stop control apparatus 20 via a communication cable 52 or the like connected to a data link connector 51 of the vehicle 90, and exchanges information with the idling stop control apparatus 20 to diagnose the vehicle 90. It is noted that, instead of connecting the communication cable 52, wireless communication may be used.

The external diagnosis apparatus 30 includes an input-output section 31, an operation section 32, a calculation section 33, and a display section 34.

The input-output section 31 receives information from the vehicle 90 and outputs information to the vehicle 90. The input-output section 31 may receive information from an external unit (e.g. external server) other than the vehicle 90 and output information to the external unit.

The operation section 32 is configured by a keyboard, a mouse, a touch-pad, or the like, not shown.

The calculation section 33 performs various calculations concerning diagnosis of the vehicle 90. For example, the calculation section 33 calculates a frequency of each factor based on the number of times of prohibition due to each factor.

The display section 34 displays an operation screen of the external diagnosis apparatus 30 and diagnostics results. The diagnostics results can be displayed not only with numerical values but also with graph or the like.

The external diagnosis apparatus 30 is used by, for example, service men of automobile retailers. The external diagnosis apparatus 30 may be configured by not only a dedicated unit but also a general-purpose notebook type personal computer, a tablet type computer, or a smartphone. Alternatively, the external diagnosis apparatus 30 may be configured not only by a single unit but also by a personal computer serving as a main unit and a cordless handset (i.e. tester) serving as an interface with the vehicle 90.

[Various Numbers of Times Counting Process of Idling Stop Control Apparatus]

Next, a various numbers of times counting process by the number of times of satisfaction of condition counter 230 and the number of times of prohibition due to each factor counter 250 will be described with reference to FIG. 2 to FIG. 4.

Figure 2:
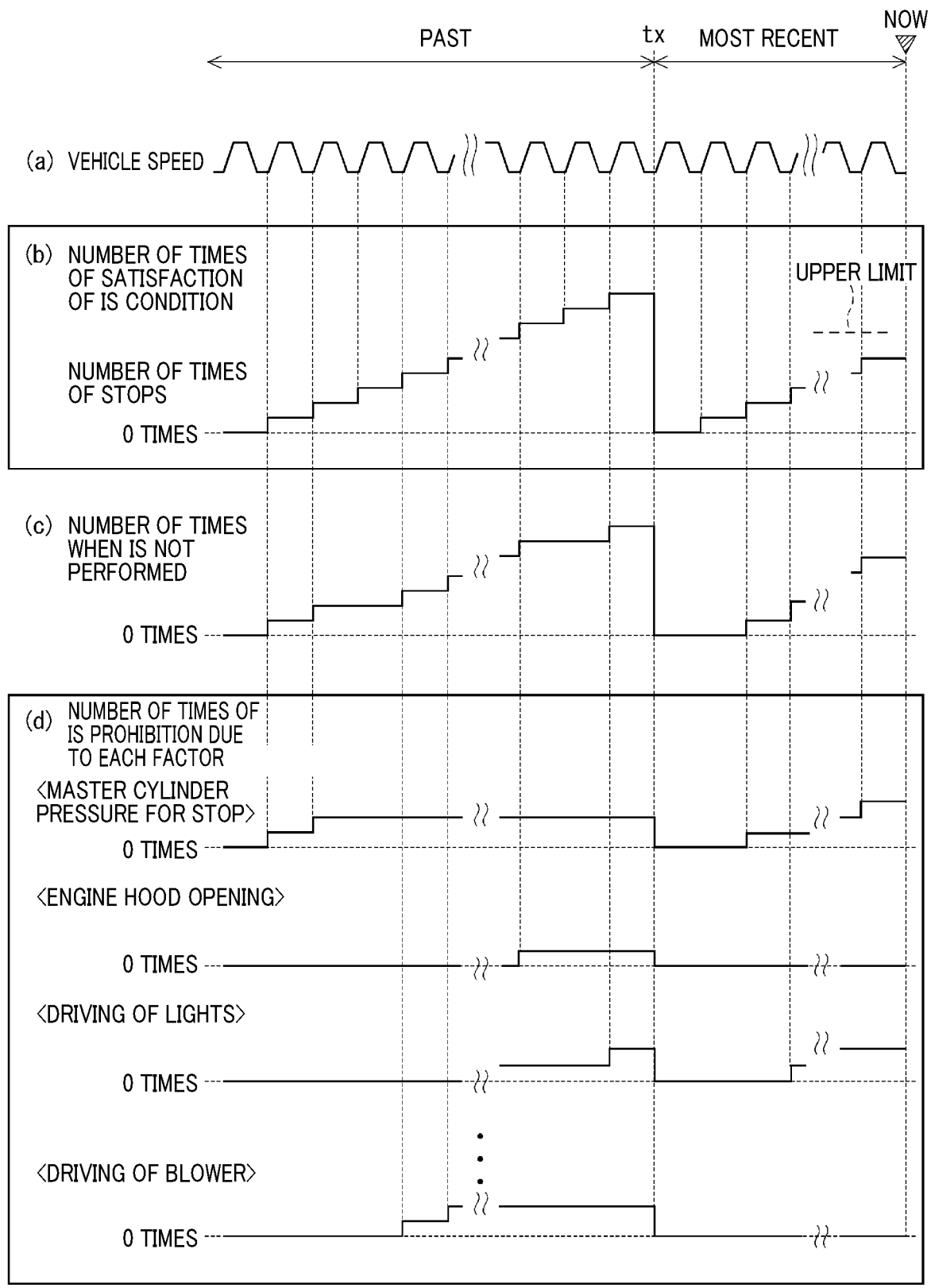
FIG. 2 is a timing diagram of various counting processes performed by an idling stop control apparatus.
Figure 3:
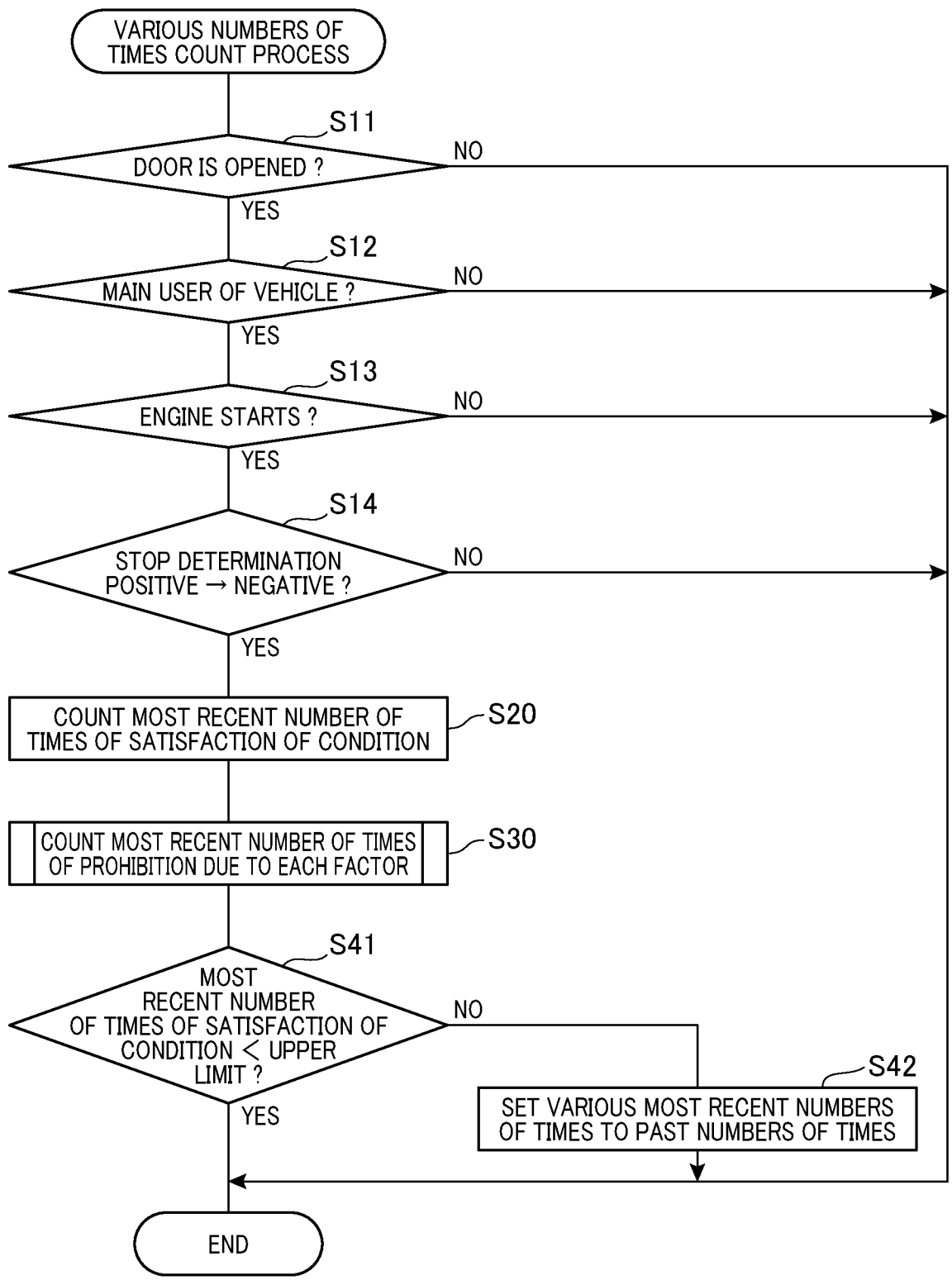
FIG. 3 is a main flowchart of the various counting processes.

FIG. 2 illustrates (a) vehicle speed, (b) the number of times when the conditions are not satisfied, (c) the number of times when idling stop is not performed, and (d) a timing diagram of the number of times of prohibition due to each factor. The time axis indicates a time period from the past time to the present time via the most recent time.

Regarding the vehicle speed, only the distinction between the time when the vehicle is stopped, that is, the vehicle speed=0, the time when the vehicle starts, the time when the vehicle travels steadily, and the time when the vehicle deaccelerates is indicated. The vehicle speed when the vehicle travels steadily is indicated to be constant. The various numbers of times counting process is performed at the timing shifting from the time when the vehicle is stopped to the time when the vehicle starts.

The number of times of prohibition due to each factor is counted for each of the prohibition factors such as the condition of master cylinder pressure for stop, the engine hood opening condition, a condition of driving of lights, and a condition of driving of a blower.

The number of times of satisfaction of the condition and the number of times of prohibition due to each factor are output as a result of the "various numbers of times counting process" performed by the idling stop control apparatus 20. If it is presumed that the idling stop conditions are necessarily satisfied when the vehicle is stopped, the number of times of satisfaction of the condition agrees with the number of times of stops and is incremented every time the vehicle stops.

The number of times when idling stop is not performed is the number of times when idling stop is not performed though the idling stop conditions are satisfied. It is noted that the number of times when idling stop is not performed is merely shown for reference, and may not be output as a result of the counting process.

The number of times of satisfaction of the condition and the number of times of prohibition due to each factor are separately stored as the most recent number of times and the past number of times, respectively. In addition, an upper limit is set for the most recent number of times of satisfaction of the condition. If the most recent number of times of satisfaction of the condition reaches the upper limit, the most recent number of times of satisfaction of the condition and the most recent number of times of prohibition due to each factor are respectively set to the past number of times of satisfaction of the condition and the past number of times of prohibition due to each factor. In addition to this, the most recent number of times of satisfaction of the condition and the most recent number of times of prohibition due to each factor are reset to 0. In other words, "past time" and "most recent time" on the time axis are distinguished by switching time tx, serving as a boundary, when the most recent number of times of satisfaction of the condition reaches the upper limit.

Next, the routine of the various numbers of times counting process will be described with reference to the flowcharts in FIG. 3 and FIG. 4. In the description of the flowcharts, signs S mean steps. In S11 to S14, it is not necessarily required that the idling stop control apparatus 20 itself directly makes determination. For example, a determination result of another controller may be obtained.

In S11, it is determined whether or not the user is in the vehicle 90 now based on a history of opening of a door. Here, the wording "the user is in the vehicle" means that the user sits on a driver's seat as a driver and basically does not mean that the user sits on a passenger's seat or a rear seat.

In S12, it is determined whether or not the user in the vehicle 90 is a main user of the vehicle 90. The determination whether the user is a main user may be made by using any method such as performing a confidential operation, which only the main user knows, inputting a password, or image authentication of a face.

In S13, it is determined whether or not the engine 91 has started.

In S14, it is determined whether or not stop determination is changed from "positive" to "negative", that is, whether or not the vehicle 90 has started traveling from a stopped state.

If YES in all the S11 to S14, the present process proceeds to S20. In contrast, if NO in any of the S11 to S14, the present process ends.

In S20, the most recent number of times counter 23 for the condition satisfaction number of times counts the most recent condition satisfaction number of times determined by the idling stop condition satisfaction determination section 21.

In S30, the most recent number of times counter 25 for the number of times of prohibition due to each factor counts the most recent number of times of prohibition due to each factor determined by the idling stop prohibition determination section 22.

A "most recent number of times of prohibition due to each factor counting process" in S30 will be described in detail with reference to FIG. 4.

Figure 4:
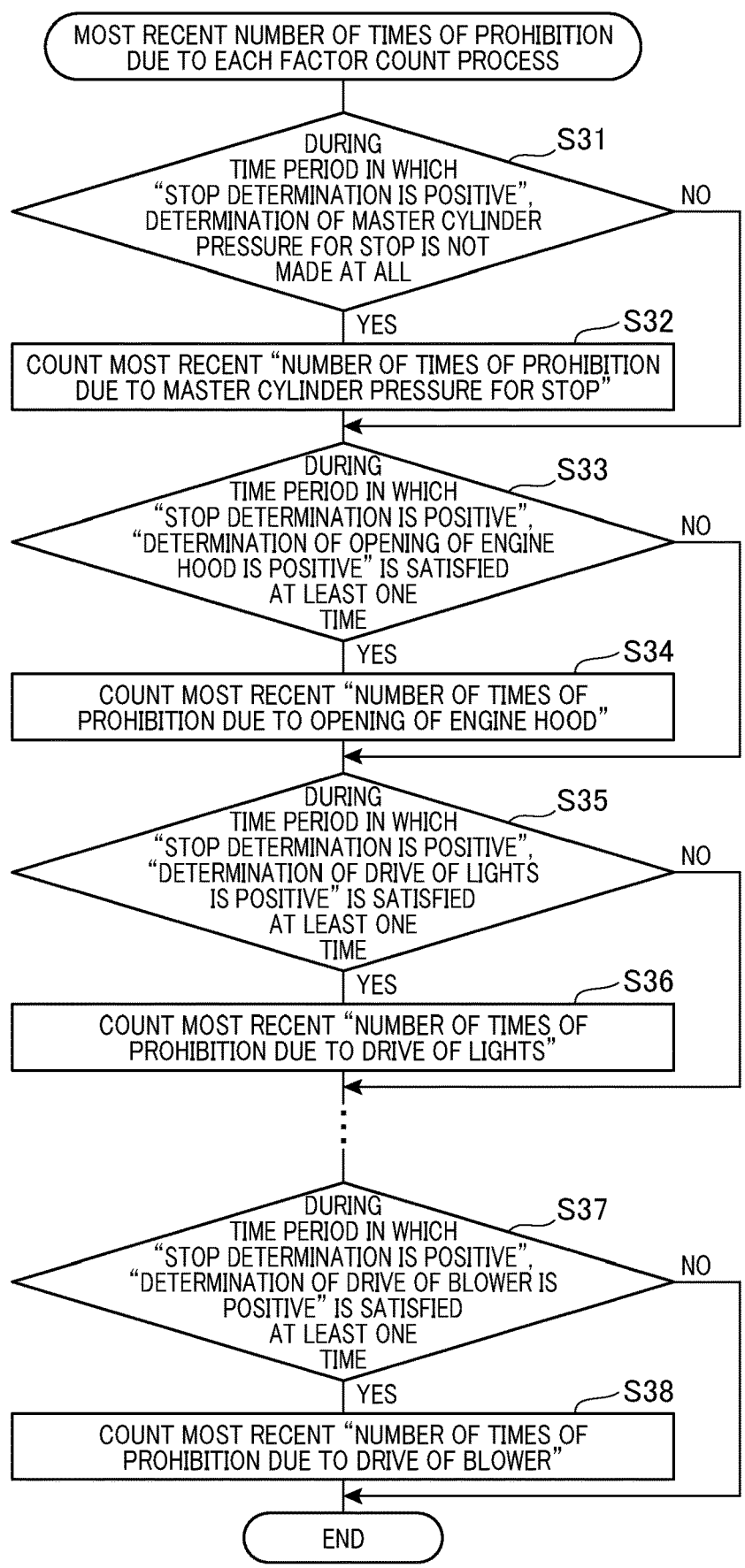
FIG. 4 is a sub-flowchart of a "most recent number of times of prohibition due to each factor counting process" in FIG. 3.

In FIG. 4, regarding prohibition factors in the fourth item, steps are exemplified which is of determining presence or absence of determination by the idling stop prohibition determination section 22 and of performing count by the most recent number of times counter 25. It is noted that similar steps may be repeated for other prohibition factors in any order.

In addition, in each determination step following S31, a history during a time period in which "the stop determination is positive" and which is before the present time at which the stop determination is changed from "positive" to "negative" is evaluated. According to the properties of the prohibition factors, the number of times of prohibition due to each factor is counted "when the idling stop prohibition condition has been satisfied all the time due to the occurrence of a specific prohibition factor" or "when the idling stop prohibition condition has been satisfied at least once due to the occurrence of a specific prohibition factor".

In S31, during a time period in which "the stop determination is positive", it is determined whether or not the determination for the master cylinder pressure for stop has not been made at all. If YES in S31, in S32, the most recent "number of times of prohibition due to the master cylinder pressure for stop" is counted.

In S33, during the time period in which "the stop determination is positive", it is determined whether or not the prohibition condition that "the determination of opening of the engine hood is positive" is satisfied at least one time. If YES in S33, in S34, the most recent "number of times of prohibition due to opening of the engine hood" is counted.

In S35, during the time period in which "the stop determination is positive", it is determined whether or not the prohibition condition that "the determination of driving of the lights is positive" is satisfied at least one time. If YES in S35, in S36, the most recent "number of times of prohibition due to driving of the lights" is counted.

In S37, during the time period in which "the stop determination is positive", it is determined whether or not the prohibition condition that "the determination of driving of the blower is positive" is satisfied at least one time. If YES in S37, in S38, the most recent "number of times of prohibition due to driving of the blower" is counted.

If counts regarding all the prohibition factor items are completed, the "most recent number of times of prohibition due to each factor counting process" ends.

Returning to FIG. 3, in S41, it is determined whether the most recent number of times of satisfaction of the condition, that is, the count value of the most recent number of times counter 23 regarding the number of times of satisfaction of the condition is less than an upper limit value. If YES in S41, the present process ends. In contrast, if the most recent number of times of satisfaction of the condition has reached the upper limit value, it is determined as NO in S41, and the present process proceeds to S42.

In S42, the various most recent numbers of times are set to the past numbers of times. That is, the count value of the most recent number of times counter 23 regarding the number of times of satisfaction of the condition is set in the past number of times counter 24, and the count value of the most recent number of times counter 25 regarding the number of times of prohibition due to each factor is set in the past number of times counter 26.

Then, the routine of the various numbers of times counting process ends.

[Failure Diagnosis when Idling Stop is not Performed]

Next, a failure diagnosis using the failure diagnosis system 10 of the present embodiment carried out when idling stop is not performed will be described with reference to FIG. 5 to FIG. 7.

As described above, the idling stop control apparatus 20 does not perform idling stop when an idling stop prohibition factor has further been caused though the idling stop conditions are satisfied. However, in specific, a user who recently bought the vehicle 90 often does not grasp the idling stop prohibition factor. Hence, the user cannot determine whether the idling stop has not been performed normally based on the prohibition factor or has not been performed due to a failure of the vehicle, whereby an automobile retailer tends to receive frequent inquiries from the user due to anxiety feeling of the user.

For such inquiries, service men of the automobile retailer are required to specify the factor, due to which idling stop is not performed, appropriately and in a short time. Hence, in the failure diagnosis system 10 of the present embodiment, the external diagnosis apparatus 30 is connected to the idling stop control apparatus 20 directly or via the electronic network of the vehicle 90, and is configured to be able to read out at least the number of times of prohibition.

Figure 6A:
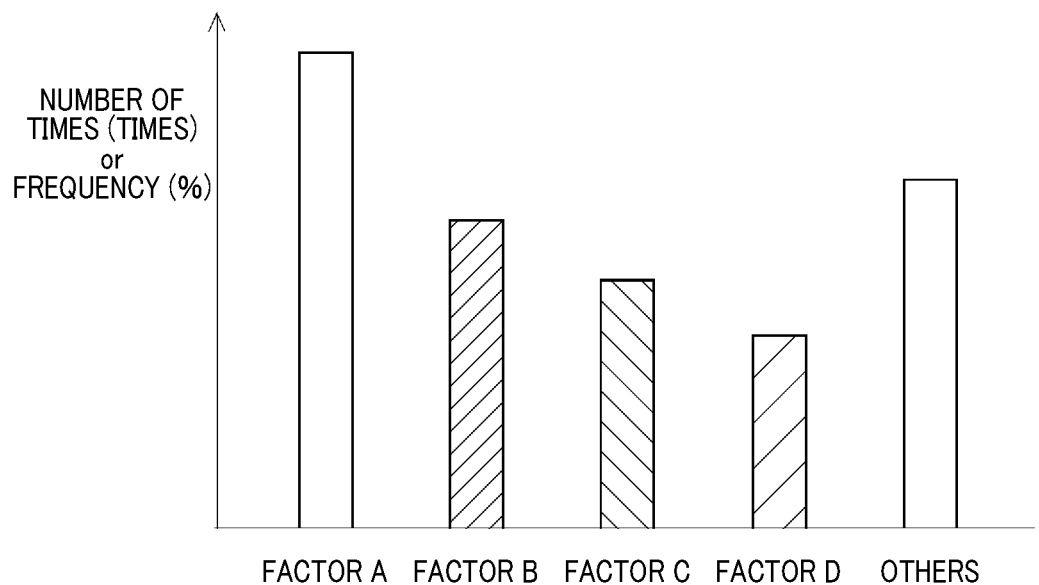
FIG. 6A is a diagram illustrating an example of screen display in a bar graph form in the external diagnosis unit.
Figure 6B:
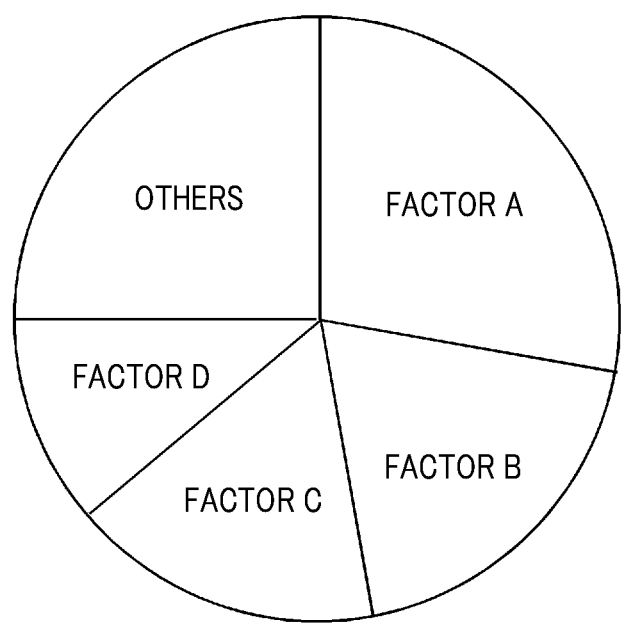
FIG. 6B is a diagram illustrating an example of screen display in a circle graph form in the external diagnosis unit.

In the examples illustrated in FIG. 5, FIG. 6A, and FIG. 6B, the external diagnosis apparatus 30 assumes that the number of times when the conditions are satisfied, the number of times when idling stop is not performed, and the number of times of prohibition due to each factor can be read out. The information on the number of times when the conditions are satisfied, the number of times when idling stop is not performed, and the number of times of prohibition due to each factor acquired by the input-output section 31 of the external diagnosis apparatus 30 is transmitted to the calculation section 33 and the display section 34. The calculation section 33 calculates a frequency of occurrence of each prohibition factor based on the number of times of prohibition due to each factor. Alternatively, the ratio of the number of times when idling stop is not performed to the number of times when the conditions are satisfied can also be calculated.

The display section 34 displays the number of times of satisfaction of the condition, the number of times of prohibition due to each factor, and the frequency of occurrence in, for example, a tabular form illustrated in FIG. 5, or may display them in a bar graph form or a circle graph form illustrated in FIG. 6A and FIG. 6B, or the like, for example, in descending order of frequency. It is noted that only one type of specific prohibition factor may be caused during a time period during which the diagnosis is to be performed.

A service person sees this display and, for example, compares the number of times of satisfaction of the condition and the number of times of prohibition due to each of the plurality of factors to grasp "in the case of this user, what kind of factor causes idling stop not to be performed, and how frequently idling stop is not performed". Thereby, the factor due to which idling stop is not performed can be appropriately diagnosed in a short time.

Troubleshooting using the external diagnosis apparatus 30 when idling stop is not performed will be described with reference to the flowchart in FIG. 7.

In S61, the vehicle 91 is taken to a retailer, and a service person conducts an interview with the user.

In S62, the external diagnosis apparatus 30 is connected to the vehicle 90 via the communication cable 52 or the like.

In S63, DTC stored in the failure determination section 27 of the idling stop control apparatus 20 is read out to solve the trouble based on the information of the DTC. If the trouble can be sufficiently solved based on only the information of the DTC, it is determined as YES in S63. Then, in S64, troubleshooting is performed based on each DTC, and in S68, the factor due to which idling stop is not performed is specified.

In contrast, if the trouble cannot be sufficiently solved based on only the information of the DTC, the present process proceeds to steps S65 to S67, which are characteristic steps of the present embodiment.

In S65, various pieces of number of times count value information are read out from the idling stop control apparatus 20, and the number of times of prohibition due to each factor and the frequency of occurrence are displayed on the screen.

In S66, the service person analyzes the factors based on the displayed number of times and frequency information.

In S67, the service person conducts an interview with the user again based on the result of the analysis.

For example, if the number of times of prohibition due to the determination of the master cylinder pressure information for stop is large, the user is asked how much the brake pedal is depressed while the car is stopped. If the user weakly depresses the brake pedal, the user is notified that it is the prohibition factor.

In addition, for example, if the number of times of prohibition due to opening of the engine hood is large, the user is asked whether the user is likely to forget to close the hood after a daily check.

According to the results of the re-interview, in S68, the service person specifies the factor due to which idling stop is not performed.

Effects of the Present Embodiment

In the related art in Patent Literature 1 (Japanese Patent No. 5714132), an external diagnosis unit is connected to the vehicle, and failure codes respectively stored in a plurality of ECUs are read out to the external diagnosis unit. An operator requires a user to reproduce a driving state where "idling stop is not often activated", to determine whether idling stop is performed normally in a state where the vehicle is driven. Hence, an interview by the operator takes a lot of time. In addition, the driving state is reproduced in a state where the user rides the vehicle with the operator. Hence, a burden on the user increases.

In contrast to the above related art, the idling stop control apparatus 20 and the failure diagnosis system 10 provide the following effects.

(1) The idling stop control apparatus 20 includes a number of times of prohibition counter 250 that counts the number of times when idling stop is prohibited from being performed due to the occurrence of one or more specific prohibition factors.

Hence, a count value of the number of times of the occurrence of the specific factor can be used as diagnostic information. Hence, when "the factor causing idling stop not to be performed though the idling stop conditions are satisfied" is diagnosed, the information on the number of times of occurrence of the prohibition factor is used. Thereby, the user does not need to reproduce the driving state, whereby diagnostic time can be reduced. In addition, conventional problems that cannot be solved by using DTC can be appropriately handled.

(2) The number of times of prohibition counter 250 of the present embodiment is the "per-factor number of times of prohibition counter 250" that counts the number of times when it is determined that any of the plurality of specific prohibition factors has been caused. Thereby, each prohibition factor due to which idling stop is not performed can be diagnosed widely.

(3) The count value of the number of times of prohibition of the number of times of prohibition due to each factor counter 250 is stored in the non-volatile memories 251 and 261. If the relationship between the operation factor and the state where idling stop is not performed is associated with a time axis and is stored, the memory capacity increases. In contrast, by storing the number of times of prohibition due to each factor, the memory capacity can be decreased.

In addition, since a non-volatile memory is used as the storage section, even when a power supply of the vehicle 90 is disconnected, the count value of the number of times of prohibition can be stored.

(4) The idling stop control apparatus 20 further includes the number of times of satisfaction of condition counter 230 that counts the number of times of satisfaction of the condition, which is the number of times of determinations that the idling stop conditions have been satisfied. Thereby, the determination can be made by comparing the number of times of satisfaction of the condition with the number of times of prohibition.

It is noted that the number of times of satisfaction of condition counter 230 also has the non-volatile memories 231 and 241 that can store the number of times of satisfaction of the condition as in the number of times of prohibition due to each factor counter 250. Thereby, when the power supply of the vehicle 90 is disconnected, the count value of the number of times of satisfaction of the condition can be stored.

(5) The number of times of satisfaction of condition counter 230 and the number of times of prohibition due to each factor counter 250 respectively include most recent number of times counters 23 and 25 that count the most recent number of times of occurrences, and the past number of times counters 24 and 26 that count the past number of times of occurrences before counting the most recent number of times of occurrences starts.

By comparing the most recent number of times of occurrences with the past number of times of occurrences, for example, environmental factors such as weather that are not based on the user property and accidental factors such as forgetting to close a hood can be easily grasped.

(6) When the count value of the most recent number of times counter 23 for the condition satisfaction number of times reaches an upper limit, the count values of the most recent number of times counters 23 and 25 for the condition satisfaction number of times and the number of times of prohibition due to each factor are respectively set to the count values of the past number of times counters 24 and 26.

Hence, the capacity of counter memories of the most recent number of times counters 23 and 25 can be decreased.

(7) The number of times of prohibition due to each factor counter 250 prohibits counting the number of times of prohibition due to each factor, when the fact is detected that a user different from the main user of the vehicle 90 rides the vehicle.

When a user different from the main user rides the vehicle, a situation changes in which the prohibition factors are caused based on common usage of the vehicle by a user or a habit of the user. Hence, erroneous determination may be caused in the diagnosis based on the count value. Therefore, according to the configuration, the reliability of the data can be improved by excluding the data of a different user.

In addition, when the fact is detected that a user different from the main user rides the vehicle, the number of times of satisfaction of condition counter 230 also prohibits counting the number of times of satisfaction of the condition. Hence the reliability of the data used for the determination in which the number of times of satisfaction of the condition is compared with the number of times of prohibition can be improved.

(8) The prohibition factors include user property factors that are factors based on the user properties, for example, such as the condition of master cylinder pressure for stop. That is, each prohibition factor based on daily usage of the vehicle by the user or a habit of the user is grasped as a group of the factors due to which idling stop is not performed.

In addition, the prohibition factors include non-user property factors that are factors not based on the user properties, for example, such as the engine hood opening condition. That is, each prohibition factor, which is caused in a state where the user does not intend it, is grasped as a group of the factors due to which idling stop is not performed.

(9) The idling stop control apparatus 20 includes the input-output section 28 that can be accessed by an external unit so that at least reading out and resetting the number of times of prohibition can be performed.

Hence, a service person can read out and diagnose the number of times of prohibition in a state where the idling stop control apparatus 20 is installed in the vehicle 90, and can perform initialization after the diagnosis. Therefore, operability is improved, whereby diagnostic time is reduced. Furthermore, debugging can be effectively performed during the development.

(10) The input-output section 28 of the idling stop control apparatus 20 is provided so as to be able to communicate with one or more control units 41, 42 via individual communication paths or the electronical network 40 constructed by a plurality of control units installed in the vehicle 90.

Hence, internal information of the idling stop control apparatus 20 can be read from or be written to the control units of the vehicle 90, whereby diagnosis can be carried out without using the dedicated external diagnosis apparatus 30. In addition, a dedicated communication means for diagnosis is not required to be set.

(11) The failure diagnosis system 10 includes the idling stop control apparatus 20 and the external diagnosis apparatus 30, which is connected to the idling stop control apparatus 20 and exchanges information with the idling stop control apparatus 20 to diagnoses the vehicle 90. The failure diagnosis system 10 diagnoses "the factor due to which idling stop is not performed when idling stop conditions are satisfied". The external diagnosis apparatus 30 is connected to the idling stop control apparatus 20 directly or via the network of the vehicle 90 and can read out at least the number of times of prohibition.

Hence, failure diagnosis can be carried out in a state where the idling stop control apparatus 20 is installed in the vehicle. In addition, since the factor due to which idling stop is not performed can be analyzed based on the read out number of times of prohibition, diagnostic time can be reduced.

(12) The display section 34 of the external diagnosis apparatus 30 displays information including the number of times of prohibition read out from the idling stop control apparatus 20 on the screen.

In addition, in the present embodiment in which the number of times of prohibition due to each factor counter 250 of the idling stop control apparatus 20 counts the number of times of prohibition due to each of the plurality of factors, the calculation section 33 calculates a frequency of occurrence of each prohibition factor based on the number of times of prohibition due to each factor. Then, the display section 34 displays the frequency of occurrence of each prohibition factor calculated by the calculation section 33 as numerical values or as a graph.

Hence, a service person can easily analyze the factor due to which idling stop is not performed, whereby diagnostic time can be reduced.

In addition, in the present embodiment, in which the idling stop control apparatus 20 includes the number of times of satisfaction of condition counter 230, the calculation section 33 can calculate the ratio of the number of times of prohibition due to each factor to the condition satisfaction number of times, and the display section 34 can display the ratio.

Hence, a service person can analyze the factor due to which idling stop is not performed, based on comprehensive information on the condition satisfaction number of times and the number of times of prohibition due to each factor, whereby diagnosis can appropriately be performed in short time.

Other Embodiments (a) The idling stop control apparatus may not include the number of times of satisfaction of condition counter, and may count the number of times of satisfaction by using a number of times of prohibition counter. By minimizing the number of pieces of information used for diagnosis, a burden on a service person and a calculation load can be reduced.

(b) The number of times of prohibition counter may not count the number of times of prohibition due to each of a plurality of prohibition factors. For example, the number of times of prohibition counter may count only the number of times of occurrence of one specific prohibition factor so that a service person can grasp the number of times. Hence, the diagnosis only for one specific factor can be performed more rapidly.

In addition, regarding a plurality of prohibition factors, the number of times of prohibition counter may count the number of times when idling stop is not performed, which is a logical addition of the number of times of prohibition as, the number of times of prohibition. In this case, for example, a service person can grasp how frequently idling stop is not performed by comparing, for example, the number of times of prohibition with the condition satisfaction number of times.

(c) At least one of the number of times of satisfaction of condition counter and the number of times of prohibition counter may not have both the most recent number of times counter and the past number of times counter, but perform a counting process from the past time to the most recent time by using one counter. Alternatively, a plurality of past number of times counters may be provided for respective counting processes at respective predetermined time periods.

(d) The configuration concerning input and output of information of the idling stop control apparatus 20 of the vehicle 90, the configuration concerning the connection between the vehicle 90 and the external diagnosis apparatus 30, the configuration for the display of the external diagnosis apparatus 30, and the like are not limited to those illustrated in the drawings, but may be combinations of any well-known techniques.

(e) Specific idling stop prohibition factors are not limited to those exemplified in the above embodiment, but may be any prohibition factors corresponding performance of a vehicle, an area and a season in which the vehicle is used, or the like.

The idling stop control apparatus of the embodiment includes: the idling stop condition satisfaction determination section (21), the idling stop prohibition determination section (22), and the number of times of prohibition counter (250).

The idling stop condition satisfaction determination section determines whether an idling stop condition, which is a predetermined condition for stopping idling of an engine (91) of a vehicle (90), is satisfied.

The idling stop prohibition determination section determines that, if the idling stop condition is satisfied, an idling stop prohibition condition is satisfied due to occurrence of one or more specific idling stop prohibition factors due to which idling stop is prohibited from being performed The number of times of prohibition counter counts a "number of times of prohibition", which is a "number of times that the idling stop prohibition determination section has determined that the idling stop prohibition condition has been satisfied".

Hence, a count value of the number of times of the occurrence of the specific prohibition factor can be used as diagnostic information. Hence, when "the factor causing idling stop not to be performed though the idling stop conditions are satisfied" is diagnosed, the information on the number of times of occurrence of the prohibition factor is used. Thereby, the user is not required to reproduce the driving state, whereby diagnostic time can be reduced. In addition, conventional problems that cannot be solved by using DTC can be appropriately handled.

The number of times of prohibition counter may count only the number of times of the occurrence of one specific prohibition factor, or may count the number of times when idling stop is not performed, which is a logical addition of a plurality of prohibition factors. It is noted that, preferably, the number of times of prohibition counter counts the number times of prohibition due to each of the plurality of prohibition factors. Thereby, each prohibition factor due to which idling stop is not performed can be diagnosed widely.

In addition, the idling stop control apparatus of the present invention may further include the number of times of satisfaction of condition counter (230) that counts a "condition satisfaction number of times", which is a "number of times of determinations by the idling stop condition satisfaction determination section that the idling stop condition has been satisfied". Thereby, the determination can be made by comparing the condition satisfaction number of times with and the prohibition number of times.

In addition, the failure diagnosis system of the present embodiment includes the idling stop control apparatus, and the external diagnosis apparatus (30) that is connected to the idling stop control apparatus and exchanges information with the idling stop control apparatus to diagnoses the vehicle. The failure diagnosis system diagnoses a factor due to which idling stop is not performed when the idling stop condition is satisfied. According to the failure diagnosis system, since a factor due to which idling stop is not performed can be analyzed by using information on the number of occurrence of specific prohibition factor, diagnostic time can be reduced.

The present invention is not limited to the above embodiments, and can be implemented in various embodiments within a scope that does not depart from the spirit of the present invention.

REFERENCE SIGNS LIST

10 . . . failure diagnosis system
20 . . . idling stop control apparatus
21 . . . idling stop condition satisfaction determination section
22 . . . idling stop prohibition determination section
230 . . . number of times of satisfaction of condition counter
250 . . . number of times of prohibition due to each factor counter (number of times of prohibition counter)
30 . . . external diagnosis apparatus
90 . . . vehicle
91 . . . engine

The invention claimed is:

1. An idling stop control apparatus comprising:
an idling stop condition satisfaction determination section that determines whether an idling stop condition, which is a predetermined condition for stopping idling of an engine of a vehicle, is satisfied;
an idling stop prohibition determination section that determines that, if the idling stop condition is satisfied, an idling stop prohibition condition is satisfied due to occurrence of one or more specific idling stop prohibition factors due to which idling stop is prohibited from being performed;
a number of times of satisfaction of condition counter that counts a condition satisfaction number of times, which is a number of times that the idling stop condition satisfaction determination section has determined that the idling stop condition has been satisfied; and
a number of times of prohibition counter that counts a number of times of prohibition, which is a number of times that the idling stop prohibition determination section has determined that the idling stop prohibition condition has been satisfied, wherein
the number of times of satisfaction of condition counter and the number of times of prohibition counter include a most recent number of times counter that counts a most recent number of times of occurrence, and a past number of times counter that counts a past number of times of occurrence before counting the most recent number of times of occurrence starts, and
when a count value of the most recent number of times counter for the number of times of satisfaction of condition reaches an upper limit, the count values of the most recent number of times counter for the number of times of satisfaction of condition and the number of times of prohibition are respectively set to the count values of the past number of times counter.

2. The idling stop control apparatus according to claim 1, wherein
the number of times of prohibition counter counts each of the numbers of times of prohibition due to each of the plurality of prohibition factors.

3. The idling stop control apparatus according to claim 1, wherein
the number of times of prohibition counter has a storage section that is capable of storing a count value.

4. The idling stop control apparatus according to claim 1, wherein
the prohibition factors include a user property factor that is based on a user property.

5. The idling stop control apparatus according to claim 1, wherein
the prohibition factors include a non-user property factor that is not based on a user property.

6. The idling stop control apparatus according to claim 1, further comprising an input-output section that is accessible by an external unit so that at least reading out and resetting the number of times of prohibition are performed.

7. The idling stop control apparatus according to claim 6, wherein
the input-output section is provided so as to communicate with one or more control units via individual communication paths or an electronic network constructed by a plurality of control units installed in the vehicle.

8. A failure diagnosis system comprising:
the idling stop control apparatus according to claim 6; and
an external diagnosis apparatus that is connected to the idling stop control apparatus and exchanges information with the idling stop control apparatus to diagnoses the vehicle, wherein
the failure diagnosis system diagnoses a factor due to which idling stop is not performed when the idling stop condition is satisfied.

9. The failure diagnosis system according to claim 8, wherein
the external diagnosis apparatus is connected to the idling stop control apparatus directly or via a network of the vehicle and is capable of reading out at least the number of times of prohibition.

10. The failure diagnosis system according to claim 9, wherein
the external diagnosis apparatus comprises a display section that displays information including the number of times of prohibition read out from the idling stop control apparatus.

11. The failure diagnosis system according to claim 10, wherein
the number of times of prohibition counter of the idling stop control apparatus counts each of the numbers of times of prohibition due to each of the prohibition factors,
the external diagnosis apparatus further comprises a calculation section that calculates a frequency of occurrence of each prohibition factor based on the number of times of prohibition due to each of the prohibition factors, and
the display section displays the frequency of occurrence of each prohibition factor calculated by the calculation section as a numerical value or as a graph.

12. An idling stop control apparatus comprising:
an idling stop condition satisfaction determination section that determines whether an idling stop condition, which is a predetermined condition for stopping idling of an engine of a vehicle, is satisfied;
an idling stop prohibition determination section that determines that, if the idling stop condition is satisfied, an idling stop prohibition condition is satisfied due to occurrence of one or more specific idling stop prohibition factors due to which idling stop is prohibited from being performed; and
a number of times of prohibition counter that counts a number of times of prohibition, which is a number of times that the idling stop prohibition determination section has determined that the idling stop prohibition condition has been satisfied, wherein the number of times of prohibition counter prohibits counting the number of times of prohibition when it is detected that a user different from a main user of the vehicle rides the vehicle.

13. The idling stop control apparatus according to claim 12, further comprising a number of times of satisfaction of condition counter that counts a condition satisfaction number of times, which is a number of times that the idling stop condition satisfaction determination section has determined that the idling stop condition has been satisfied.

14. The idling stop control apparatus according to claim 13, wherein
the number of times of satisfaction of condition counter and the number of times of prohibition counter include a most recent number of times counter that counts a most recent number of times of occurrence, and a past number of times counter that counts a past number of times of occurrence before counting the most recent number of times of occurrence starts.

15. The idling stop control apparatus according to claim 14, wherein
when a count value of the most recent number of times counter for the number of times of satisfaction of condition reaches an upper limit, the count values of the most recent number of times counter for the number of times of satisfaction of condition and the number of times of prohibition are respectively set to the count values of the past number of times counter.

\* \* \* \* \*